United States Patent
Le et al.

(10) Patent No.: US 12,468,934 B2
(45) Date of Patent: Nov. 11, 2025

(54) SYSTEMS AND METHODS FOR GENERATING DYNAMIC CONVERSATIONAL RESPONSES USING DEEP CONDITIONAL LEARNING

(71) Applicant: Capital One Services, LLC, McLean, VA (US)

(72) Inventors: Minh Le, McLean, VA (US); Rui Zhang, McLean, VA (US); Jonathan Gross, McLean, VA (US)

(73) Assignee: Capital One Services, LLC, McLean, VA (US)

(*) Notice: Subject to any disclaimer, the term of this patent is extended or adjusted under 35 U.S.C. 154(b) by 1022 days.

(21) Appl. No.: 17/316,998

(22) Filed: May 11, 2021

(65) Prior Publication Data
US 2022/0366233 A1    Nov. 17, 2022

(51) Int. Cl.
| | |
|---|---|
| *G06N 3/08* | (2023.01) |
| *G06F 16/9032* | (2019.01) |
| *G06F 18/20* | (2023.01) |
| *G06F 40/30* | (2020.01) |
| *G06N 3/045* | (2023.01) |
| *G06N 5/022* | (2023.01) |

(52) U.S. Cl.
CPC .......... *G06N 3/08* (2013.01); *G06F 16/90332* (2019.01); *G06F 18/295* (2023.01); *G06F 40/30* (2020.01); *G06N 3/045* (2023.01); *G06N 5/022* (2013.01)

(58) Field of Classification Search
CPC .......... G06N 3/08; G06N 3/045; G06N 5/022; G06F 16/90332; G06F 18/295; G06F 40/30
See application file for complete search history.

(56) References Cited

U.S. PATENT DOCUMENTS

| | | | | |
|---|---|---|---|---|
| 8,706,472 B2* | 4/2014 | Ramerth | ................. | G06F 40/53 |
| | | | | 704/251 |
| 9,501,764 B2* | 11/2016 | Wu | ................. | H04L 67/02 |
| 9,921,726 B1* | 3/2018 | Sculley | ................. | H04W 4/30 |
| 10,528,047 B1* | 1/2020 | Trujillo | ................. | G06V 10/764 |
| 10,993,612 B1* | 5/2021 | Abou Shousha | ....... | A61B 3/032 |
| 11,068,786 B1* | 7/2021 | Liu | ................. | G06N 3/045 |
| 2010/0250339 A1* | 9/2010 | Villarreal | ............ | G06Q 10/103 |
| | | | | 705/320 |
| 2018/0053091 A1* | 2/2018 | Savvides | ............ | G06N 3/045 |

(Continued)

OTHER PUBLICATIONS

Wang, "DSDR: Dynamic Semantic Discard Reader for Open-Domain Question Answering", 2018, IEEE (Year: 2018).*

(Continued)

*Primary Examiner* — Kakali Chaki
*Assistant Examiner* — Michael H Hoang
(74) *Attorney, Agent, or Firm* — Foley & Lardner LLP

(57) ABSTRACT

Methods and systems are described herein for generating dynamic conversational responses. Conversational responses include communications between a user and a system that may maintain a conversational tone, cadence, or speech pattern similar to a human during an interactive exchange between the user and the system. The interactive exchange may include the system responding to one or more user actions (which may include user inactions), and/or predicting responses prior to receiving a user action.

20 Claims, 7 Drawing Sheets

(56) References Cited

U.S. PATENT DOCUMENTS

| | | | | |
|---|---|---|---|---|
| 2019/0190852 A1* | 6/2019 | Zhang | .................... | G06F 3/06 |
| 2019/0299008 A1* | 10/2019 | Rao | .................... | G06N 3/045 |
| 2019/0355366 A1* | 11/2019 | Ng | .................... | G10L 17/18 |
| 2020/0410054 A1* | 12/2020 | Kumar | .................... | G06F 40/30 |
| 2021/0019551 A1* | 1/2021 | Yan | .................... | G06V 10/40 |
| 2021/0064935 A1* | 3/2021 | Park | .................... | G06N 5/046 |

OTHER PUBLICATIONS

Chan, "Question-answering dialogue system for emergency operations", Dec. 2019, Elsevier, vol. 41 (Year: 2019).*

Ren, "CRSAL: Conversational Recommender Systems with Adversarial Learning", 2020, Association for Computing Machinery (Year: 2020).*

* cited by examiner

SYSTEMS AND METHODS FOR GENERATING DYNAMIC CONVERSATIONAL RESPONSES USING DEEP CONDITIONAL LEARNING

BACKGROUND

In recent years, the amount and uses of interactive programs has risen considerably. These interactive programs may generate and respond to user interactions in a user interface in order to engage in a conversational interaction with the user. The conversational interaction may include a back-and-forth exchange of ideas and information between the interactive program and the user.

SUMMARY

Methods and systems are described herein for generating dynamic conversational responses. Conversational responses include communications between a user and a system that may maintain a conversational tone, cadence, or speech pattern similar to a human during an interactive exchange between the user and the system. The interactive exchange may include the system responding to one or more user actions (which may include user inactions) and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real-time or near real-time) and accurately the intent, goal, or motivation behind a user input. These user inputs or actions may take various forms, including speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more machine learning models. For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, feature inputs for similar intents (e.g., a first intent of a user to learn about a first set of information and a second intent of a user to learn about a second set of information) may have similar feature inputs, as much of the underlying aggregated information may be the same. Moreover, training data for a machine learning model (e.g., known intents and labeled feature inputs) may be sparse. Accordingly, determining a specific intent of a user with a high level of precision is difficult, even when using a machine learning model. Furthermore, conventional systems do not provide any follow-up recommendations, and do not dynamically respond to user feedback. Instead, conventional systems provide an initial static set of recommendations, and are thus not dynamic.

However, even if models are adapted to be updated based on user feedback, another technical challenge arises. Specifically, models function by trying to find an average or mean behavior based on a given set of inputs (e.g., for a given set of user characteristics, the system tries to predict the behavior of the user). This approach, however, creates model disrupting biases based on any outlier behavior. For example, the recent COVID-19 pandemic created a huge change in behavior for many users. After COVID-19 subsides, the models are still biased, and expecting another pandemic event in the future. Similarly, if the models ignore recent data, the models are inaccurate during events that cause changes in behavior.

To overcome these technical challenges, the methods and systems disclosed herein use a multi-step framework that comprises knowledge transfer algorithms, constrained deep learning, and/or probabilistic programming. These features allow the system to dynamically update itself to provide conversational responses that are based on current events, but that are not overly biased after events subside. In particular, the system generates a model that may temporarily be pulled in a particular direction based on current events, but without unduly biasing an established model.

For example, the methods and systems use a multi-step framework that comprises training a neural network in multiple steps (e.g., a first training regime and a second training regime). The first training regime comprises training an initial version of the neural network based on a first data set, and using knowledge distillation (e.g., a process of transferring knowledge from a large model to a smaller one). The second training regime comprises further training the initial version based on a second data set, and using a second neural network as a constraint (e.g., the parameters of the second neural network may remain unchanged during the second training regime, and/or may comprise an output layer for the initial version based on the second training regime). The system may then generate for display a dynamic conversational response based on an output (e.g., a multivariate distribution of probable intents of the user) of the neural network.

In some aspects, the methods and systems are disclosed for generating dynamic conversational responses using conditional deep learning. The system may receive user data in response to a user interacting with a user interface. The system may generate a feature input based on the user data. The system may input the feature input into a first neural network, wherein the first neural network is trained based on a first training regime, and a second training regime, wherein the first training regime comprises training an initial version of the first neural network based on a first data set and using knowledge distillation, wherein the second training regime comprises further training the initial version based on a second data set, and using a second neural network as a constraint, and wherein the second neural network is trained based on a third data set. The system may receive an output from the first neural network. The system may generate for display on the user interface a first dynamic conversational response based on the output, wherein the first dynamic conversational response corresponds to a first probable intent of the user.

Various other aspects, features, and advantages of the invention will be apparent through the detailed description of the invention, and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
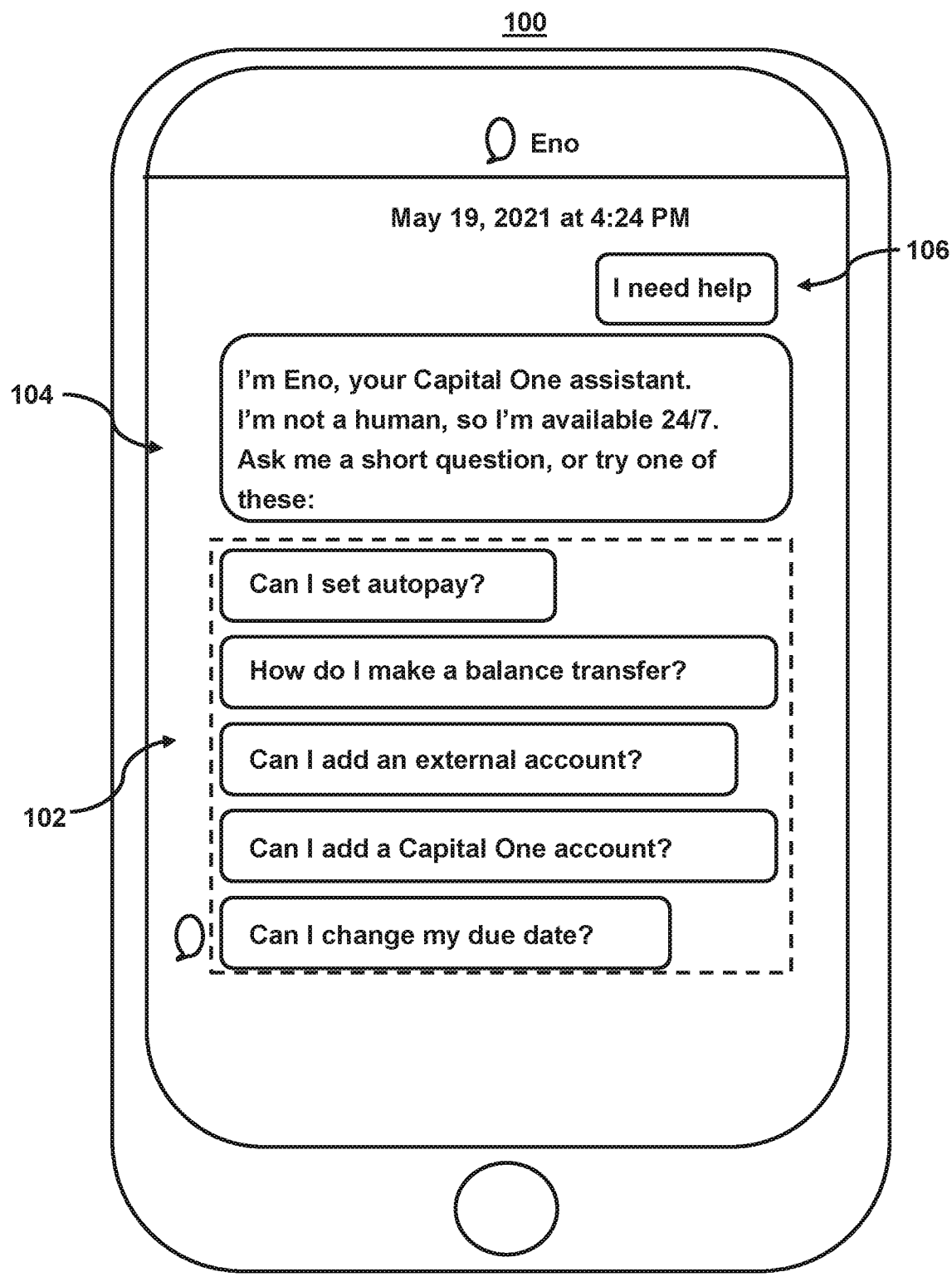
FIG. 1 shows an illustrative user interface for presenting dynamic conversational responses using machine learning models, in accordance with one or more embodiments.

FIG. 1 shows an illustrative user interface for presenting dynamic conversational responses using machine learning models, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). The system may provide human-like interactions and/or create applications that mimic the tone, cadence, and speech patterns of humans. In order to fulfill user-interaction requirements, the system needs to be helpful and respond intelligently by providing relevant responses to user inputs, whether these inputs are received via text, audio, or video input. For example, the system may use one or more artificial intelligence models (including machine learning models, neural networks, etc.) referred to collectively as "models."

In order to maintain the conversational interaction, the system may need to generate responses (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100, inputting a query (e.g., query 106) into user interface 100, and/or a prior action (or lack thereof) by a user to a prior response generated by the system, the system may take one or more steps to generate dynamic conversational responses (e.g., response 104). These steps may include retrieving data about the user, retrieving data from other sources, monitoring user actions, and/or other steps in order to generate a feature input (e.g., as discussed below). In some embodiments, the system may generate a plurality of responses (e.g., responses 102).

In some embodiments, the feature input may include a vector of values that describes various data about a user, a user action, and/or a current or previous interaction with the user. For example, a feature is an individual measurable property or characteristic of a user, a user action, and/or a current or previous interaction with the user. For example, the feature input may comprise a column of data (e.g., an input set) that represents characteristics of user data which the system may use to select a conversation response. Alternatively or additionally, the system may include a feature input layer that receives the feature input and applies data normalization. The system may further select the information for inclusion in the feature input based on a predictive value. The information may be collected actively or passively by the system, and compiled into a user profile.

In some embodiments, the user data (e.g., a user action) may include conversation details, such as information about a current session, including a channel or platform, e.g. desktop web, iOS, mobile, a launch page (e.g., the webpage that the application was launched from), a time of launch, activities in a current or previous session before launching the application. The system may store this information, and all the data about a conversational interaction may be available in real-time via HTTP messages and/or through data streaming from one or more sources (e.g., via an API.).

In some embodiments, the user data (e.g., a user action) may include user account information such as types of accounts the user has, other accounts on file, such as bank accounts for payment, information associated with accounts, such as credit limit, current balance, due date, recent payments, or recent transactions. The system may obtain this data in real-time for model prediction through enterprise APIs.

In some embodiments, the user data (e.g., a user action) may include insights about users, provided to the application (e.g., via an API) from one or more sources, such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

Figure 2:
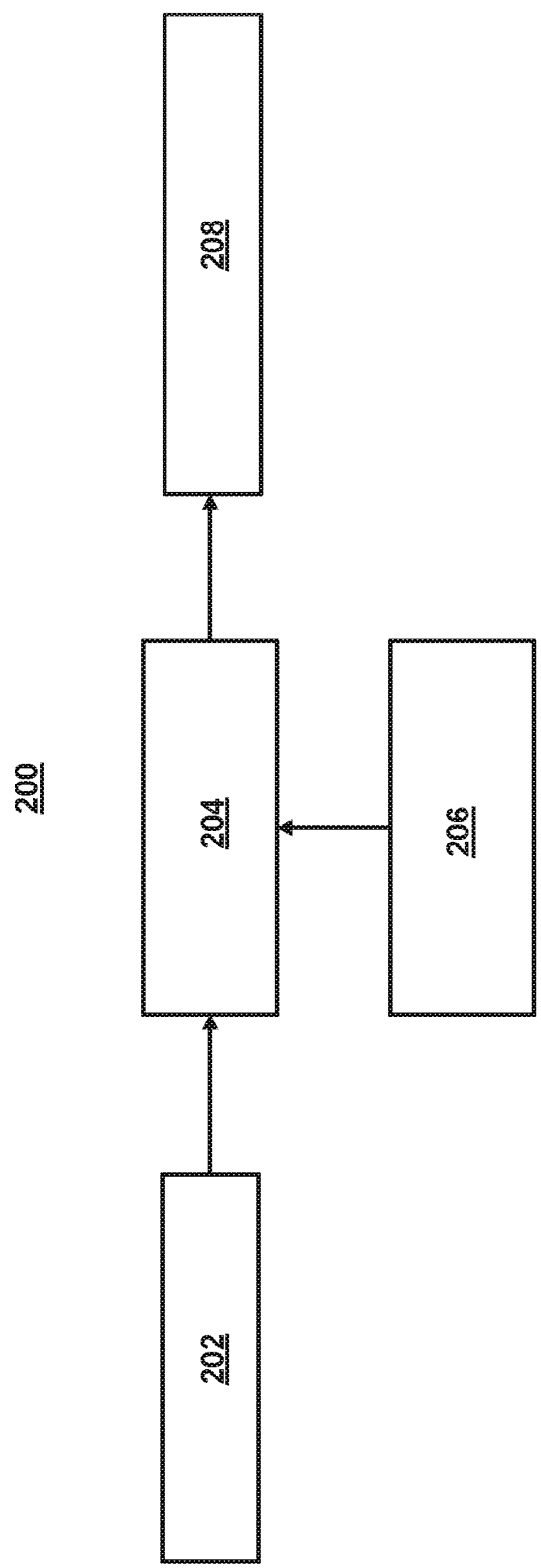
FIG. 2 shows an illustrative system architecture for incorporating user feedback into conversational responses, in accordance with one or more embodiments.

FIG. 2 shows an illustrative system architecture for incorporating user feedback into conversational responses, in accordance with one or more embodiments. For example, FIG. 2 includes system 200. System 200 shows an architecture for incorporating user feedback into a model used to predict user intent. For example, system 200 may be used to provide additional, better-informed predictions that may be used to provide dynamic conversational responses to a user. Furthermore, architecture of system 200 allows the user issues to be easily resolved with minimal effort from the user, even if an initial prediction is wrong.

For example, system 200 shows an illustrative system architecture for a conditional model that provides conditional predictions. For example, initial prediction 202 is input into conditional model 204. Conditional model 204 also receives user feedback 206. User feedback 206 may represent feedback from a user, such as the lack of a user selection of a conversational response that was generated for display. Based on initial prediction 202 and user feedback 206 (e.g., which may constitute user data), system 200 may use conditional model 204 to generate conditional prediction 208.

For example, system 200 may use conditional model 204 to generate conditional prediction 208, which resolves a latent need, issue, and/or objective at the time when the user engaged the system (e.g., a chatbot used to populate user interface 100 (FIG. 1)). For example, the system may make an initial recommendation that attempts to predict the user's intent and generate a conversational response that corresponds to that intent. The conversational response may then be generated for display in user interface 100 (FIG. 1) by the chatbot. The model, as well as its associated datasets, is accessible. System 200 may then provide a probability for each possible intent of the user, either as a direct output or secondary/derivable product. The user may then use a mechanism (e.g., active feedback of selecting responses) to indicate whether or not the initially provided response addresses his/her latent need, issue, and/or objective.

Figure 3:
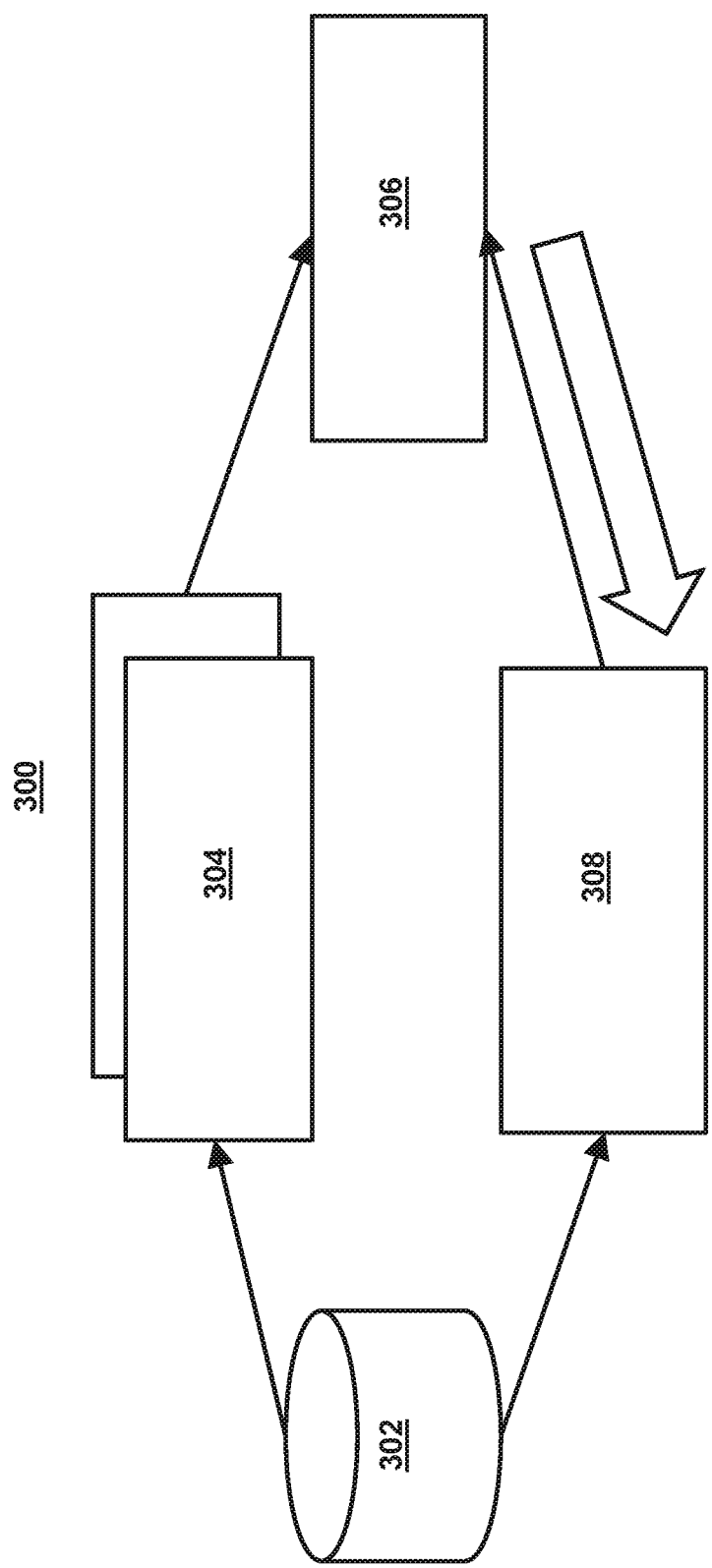
FIG. 3 is an illustrative system architecture for training a neural network for use in generating conversational responses, in accordance with one or more embodiments.

FIG. 3 is an illustrative system architecture for training a neural network for use in generating conversational responses, in accordance with one or more embodiments. The methods and systems disclosed herein may use a multi-step framework that comprises knowledge transfer algorithms, constrained deep learning and/or probabilistic programming. System 300 may be used to achieve the knowledge transfer. For example, FIG. 3 includes system 300. System 300 is used to encapsulate and transfer a robust, combined, and/or ensemble artificial intelligence model to a deep learning neural network. For example, model 304 may comprise the robust, combined, and/or ensemble artificial intelligence model, and model 308 may comprise a latent version of model 304. Model 308 may likewise comprise a deep learning neural network. For example, model 308 may comprise a latent version of model 304 as trained on data 302 using loss function 306.

To facilitate this transfer, system 300 may construct model 308 utilizing a knowledge distillation approach. In a knowledge distillation approach, the training data and model used to make the initial prediction are first considered. The original model(s) (e.g., model 304) is referred to as the teacher model or ensemble teacher learner. System 300 may benefit from this approach, as information from a larger model is transferred to a smaller one; thus, increasing efficiency and reducing the size of the model needed (e.g., in order to generate the dynamic responses). For example, system 300 may train a small model (e.g., model 308) to generalize in the same way as a larger teacher model (e.g., model 304). System 300 achieves this by using the class probabilities of the large model (e.g., model 304) as targets while training the smaller model (e.g., model 308). As the large model is an ensemble of simpler models, the geometric or arithmetic mean of their predictive distributions may be used as the target.

In some embodiments, system 300 may train model 308 to reproduce the outputs of model 304. The system may train the model 308 on the frame posterior outputs of model 304. Additionally or alternatively, to increase efficiency, the system may use one or more training model strategies. For example, the system may update the weights of the student model (e.g., model 308) by switching teacher labels at the minibatch level. Alternatively or additionally, the system may train the student model (e.g., model 308) on multiple streams of information (e.g., types of user data) from various teacher distributions via data augmentation.

Figure 4:
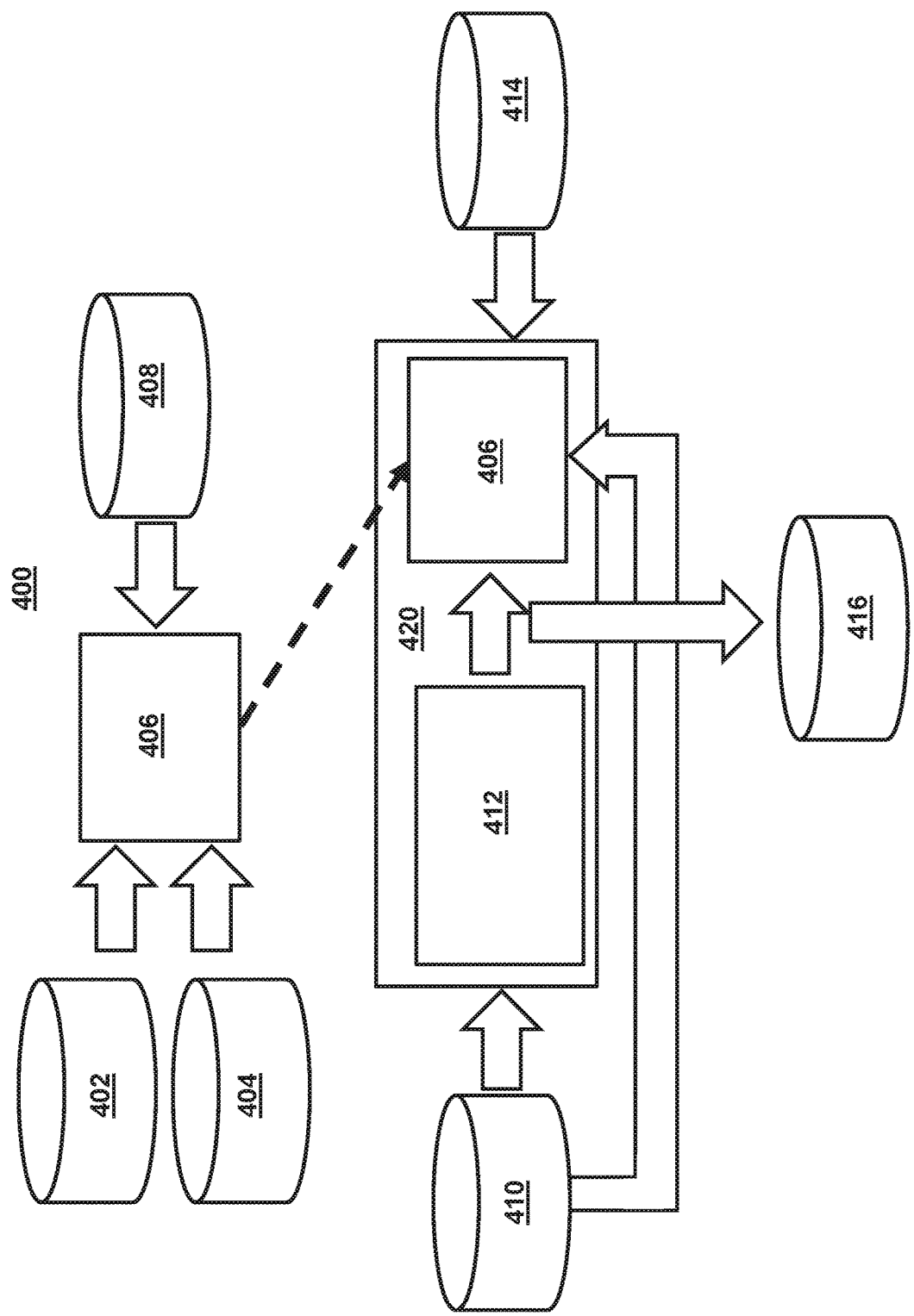
FIG. 4 is an illustrative system architecture for generating dynamic conversational responses using deep conditional learning, in accordance with one or more embodiments.

FIG. 4 is an illustrative system architecture for generating dynamic conversational responses using deep conditional learning, in accordance with one or more embodiments. For example, the methods and systems disclosed herein use a multi-step framework that comprises knowledge transfer algorithms, constrained deep learning, and/or probabilistic programming. System 400 may be used to achieve the constrained deep learning. In particular, a second neural network may be used as a constraint for an initial version of a first neural network (e.g., corresponding to model 308 (FIG. 3)).

FIG. 4 includes system 400. System 400 may be used to generate fine-tuned predictions based on an initial version of a model (e.g., model 412) and another model (e.g., model 406). Model 406 may act as a constraint on model 412 to update model 412. For example, the parameters of model 412 may remain unchanged during a training regime (e.g., a second training regime on a neural network). Alternatively or additionally, model 412 may comprise an output layer for model 406 (e.g., during the second training regime). Using this mechanism, system 400 may dynamically update itself to provide dynamic conversational responses that are based on current events, but that are not overly biased after events subside. In particular, system 400 generates a model (e.g., a finely tuned model) that may temporarily be pulled in a direction based on current events, but without unduly biasing an established model.

For example, system 400 may include model 406 and model 412. In some embodiments, model 412 may correspond to model 308 (FIG. 3)). Model 406 may be trained on a data set that comprises user data from a plurality of users, a subset of users, and/or a targeted user. For example, model 406 may be trained on initial prediction data 402, user data 404, and user feedback data 408. In some embodiments, model 406 may be a neural network that is robust and may include user data of a specified period of time.

Following a training period for model 406, model 406 may be incorporated into another model architecture (e.g., model 420) with model 412. Model 412 may represent an initial version of a first neural network (e.g., corresponding to model 308 (FIG. 3)). System 400 may then train model 420 based on user data 410 (e.g., which may be specific to a targeted user) and/or training data 414 to generate predictions 416.

During training, model 406 may act as a constraint on model 412 to update model 412. For example, the parameters of model 412 may remain unchanged during a training regime (e.g., a second training regime on a neural network). Alternatively or additionally, model 412 may comprise an output layer for model 406 (e.g., during the second training regime). For example, system 400 may dynamically update model 412 (or model 420) to provide dynamic conversational responses that are based on current events (e.g., as indicated by model 406), but that are not overly biased after events subside. In particular, system 400 generates model 420 (or model 412) (e.g., a finely tuned model) that may temporarily be pulled in a direction based on current events (e.g., data from model 406), but without unduly biasing the established model (e.g., model 412 which is based on model 304 (FIG. 3)).

Figure 5:
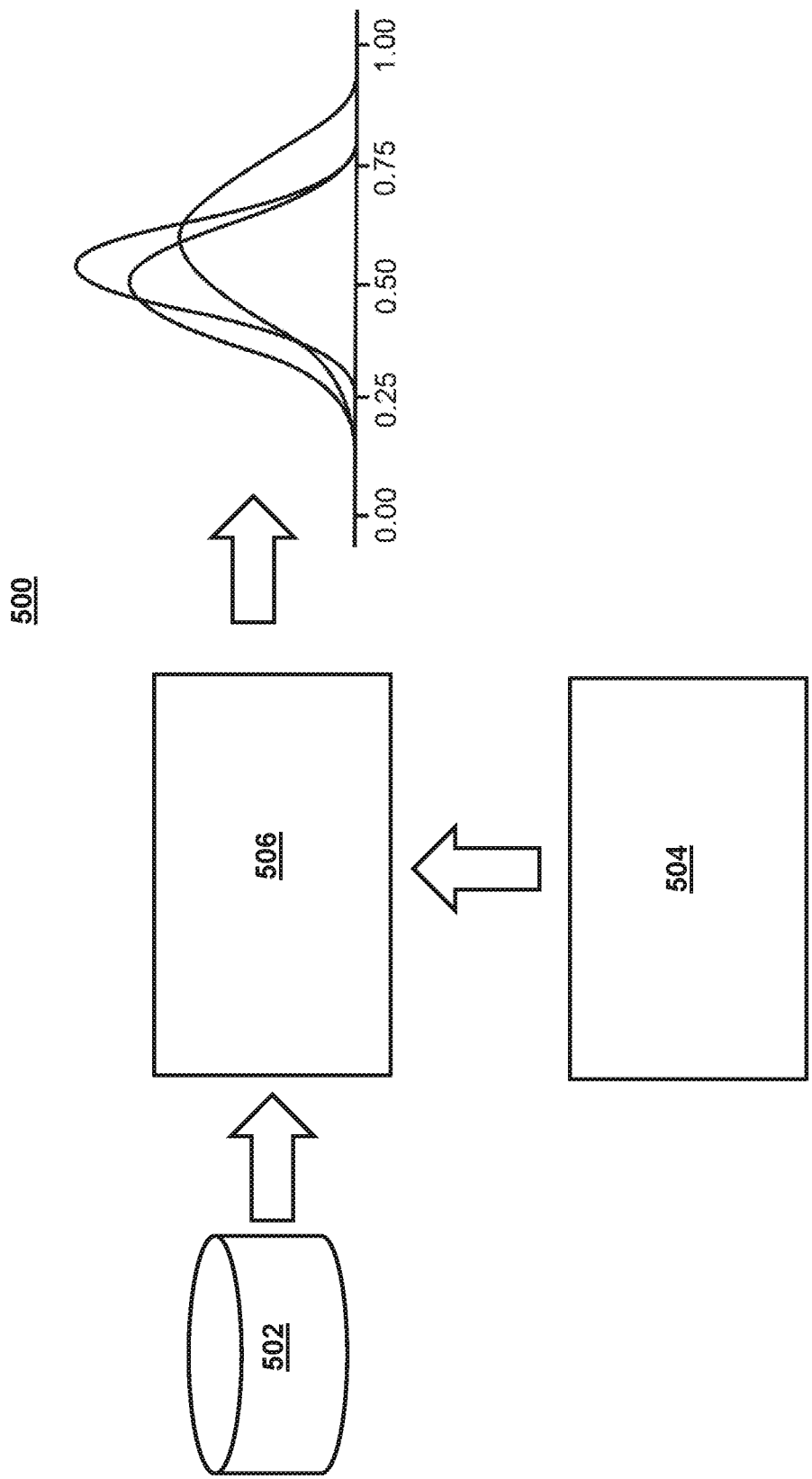
FIG. 5 is an illustrative system architecture for refining a model used to dynamic conversational responses, in accordance with one or more embodiments.

FIG. 5 is an illustrative system architecture for refining a model used to dynamic conversational responses, in accordance with one or more embodiments. For example, the methods and systems disclosed herein use a multi-step framework that comprises knowledge transfer algorithms, constrained deep learning, and/or probabilistic programming. System 500 demonstrates the probabilistic programming. For example, probabilistic programming is a programming paradigm in which probabilistic models are specified and inference for these models is performed automatically.

As shown in FIG. 5, system 500 receives user data 502. For example, user data 502 may comprises information about a user at the time a user accesses an application and/or enters a query into an application (e.g., as shown in user interface 100 (FIG. 1)). User data 502 is input into model 506. Model 506 may correspond to the finely tuned model of FIG. 4 (e.g., model 412). Model 506 may then be used to may predictions for an intent of a user.

System 500 may provide these predictions in terms of a distribution as approximated using probabilistic programming. For example, in model 506, a softmax layer may be utilized, whose output represents the various probability predictions of the possible predictions (e.g., possible intents of the user). System 500 may also further refine model 506 by applying noise shocks 504 to the network parameters of model 506. For example, by making random changes to the internal neural network model weight parameters of model 506 (e.g., random shocks or noise shocks) changes in the probabilities provided by the softmax layer can be interpreted, providing insight into the probability and/or model dynamics. System 500 may then use stochastic variable inference to better parameterize and understand these dependencies. For example by taking gradients of the objective function in combination with the random shocks, system 500 may determine clear approximations of the interdependencies between variables that can be made, allowing for a cohesive and unified probability distribution over the possible outcomes.

System 500 may also utilize the distributions generated over our possible model outcomes to determine future predictions. For example, future predictions for system 500 may now additionally be conditioned on new user feedback as it arrives. For example, if a user indicates that none of the initial predictions (e.g., corresponding to one or more of the conversational responses generated for display (e.g., response 102 (FIG. 1)) is correct, system 500 may update the distribution by conditioning on the fact that the probabilities for the rejected intents are zero.

For example, system 500 may generate three conversational responses (e.g., corresponding to three predicted intent probabilities). In response to the user selecting a first intent (e.g., instead of the other two), system 500, using a multivariate distribution, sets the probabilities of the other intents to zero (or near zero). System 500 may then derive the probability of the predictions for all other intents, with intents having the highest probability being selected by system 500.

Based on this conditioning, system 500 updates the remaining probabilities by generating a new probability distribution over our outcomes, and allowing for a new, more accurate prediction to be provided. Additionally, user feedback may be continually collected to continuously update the probability distributions; each new distribution update is dependent on the current distribution, as well as the current customer feedback.

Figure 6:
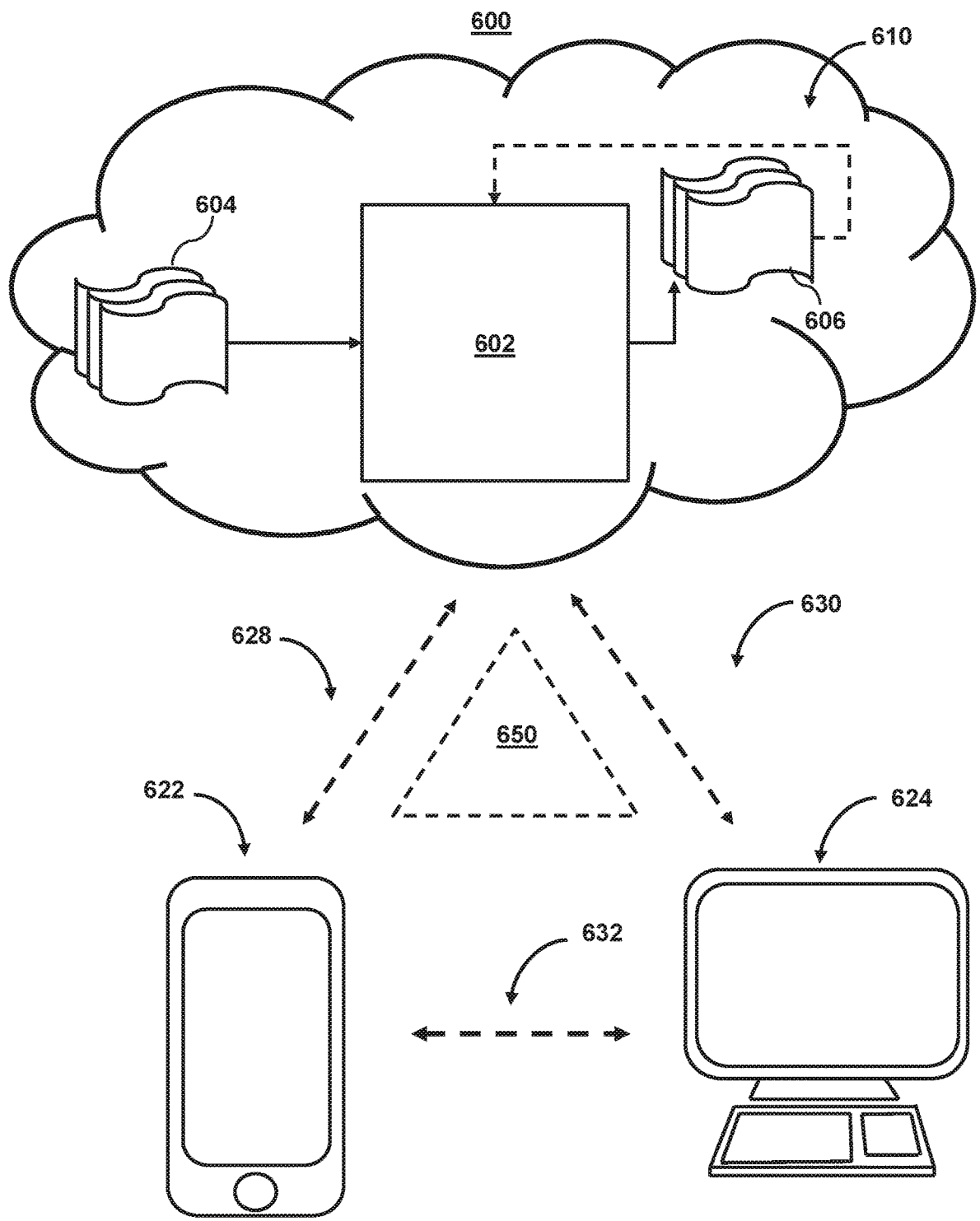
FIG. 6 shows illustrative system components for generating dynamic conversational responses using deep conditional learning, in accordance with one or more embodiments.

FIG. 6 shows illustrative system components for generating dynamic conversational responses using deep conditional learning, in accordance with one or more embodiments. For example, system 600 may represent the components used for generating dynamic conversational responses, as shown in FIG. 1. As shown in FIG. 6, system 600 may include mobile device 622 and user terminal 624. While shown as a smartphone and personal computer, respectively, in FIG. 6, it should be noted that mobile device 622 and user terminal 624 may be any computing device, including, but not limited to, a laptop computer, a tablet computer, a hand-held computer, other computer equipment (e.g., a server), including "smart," wireless, wearable, and/or mobile devices. FIG. 6 also includes cloud components 610. Cloud components 610 may alternatively be any computing device as described above, and may include any type of mobile terminal, fixed terminal, or other device. For example, cloud components 610 may be implemented as a cloud computing system, and may feature one or more component devices. It should also be noted that system 600 is not limited to three devices. Users may, for instance, utilize one or more devices to interact with one another, one or more servers, or other components of system 600. It should be noted, that, while one or more operations are described herein as being performed by particular components of system 600, those operations may, in some embodiments, be performed by other components of system 600. As an example, while one or more operations are described herein as being performed by components of mobile device 622, those operations, may, in some embodiments, be performed by components of cloud components 610. In some embodiments, the various computers and systems described herein may include one or more computing devices that are programmed to perform the described functions. Additionally, or alternatively, multiple users may interact with system 600 and/or one or more components of system 600. For example, in one embodiment, a first user and a second user may interact with system 600 using two different components.

With respect to the components of mobile device 622, user terminal 624, and cloud components 610, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 6, both mobile device 622 and user terminal 624 include a display upon which to display data (e.g., conversational response, queries, and/or notifications).

Additionally, as mobile device 622 and user terminal 624 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen and/or a dedicated input device, such as a remote control, mouse, voice input, etc.). Additionally, the devices in system 600 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM. RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the Internet, a mobile phone network, a mobile voice or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 610 may be a database configured to store user data for a user. For example, the database may include user data that the system has collected about the user through prior interactions, both actively and passively. For example, the user data may describe one or more characteristics about a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 610 may also include control circuitry configured to perform the various operations needed to generate alternative content. For example, the cloud components 610 may include cloud-based storage circuitry configured to generate alternative content. Cloud components 610 may also include cloud-based control circuitry configured to run processes to determine alternative content. Cloud components 610 may also include cloud-based input/output circuitry configured to display alternative content.

Cloud components 610 may include model 602, which may be a machine learning model (e.g., as described in FIG. 6). Model 602 may take inputs 604 and provide outputs 606. The inputs may include multiple datasets, such as a training dataset and a test dataset. Each of the plurality of datasets (e.g., inputs 604) may include data subsets related to user data, predicted intents, and/or actual intents. In some embodiments, outputs 606 may be fed back to model 602 as input to train model 602 (e.g., alone or in conjunction with user indications of the accuracy of outputs 606, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In some embodiments, model 602 may update its configurations (e.g., weights, biases, or other parameters) based on the assessment of its prediction (e.g., outputs 606) and reference feedback information (e.g., user indication of accuracy, reference labels, or other information). In some embodiments, where model 602 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 602 may be trained to generate better predictions.

In some embodiments, model 602 may include an artificial neural network. In such embodiments, model 602 may include an input layer and one or more hidden layers. Each neural unit of model 602 may be connected with many other neural units of model 602. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602 may be self-learning and trained, rather than explicitly programmed, and can perform significantly better in certain areas of problem solving, as compared to traditional computer programs. During training, an output layer of model 602 may correspond to a classification of model 602 and an input known to correspond to that classification may be input into an input layer of model 602 during training. During testing, an input without a known classification may be input into the input layer, and a determined classification may be output.

In some embodiments, model 602 may include multiple layers (e.g., where a signal path traverses from front layers to back layers). In some embodiments, back propagation techniques may be utilized by model 602 where forward stimulation is used to reset weights on the "front" neural units. In some embodiments, stimulation and inhibition for model 602 may be more free-flowing, with connections interacting in a more chaotic and complex fashion. During testing, an output layer of model 602 may indicate whether or not a given input corresponds to a classification of model 602 (e.g., a user intent).

In some embodiments, model 602 may predict alternative content. For example, the system may determine that particular characteristics are more likely to be indicative of a prediction. In some embodiments, the model (e.g., model 602) may automatically perform actions based on outputs 606. In some embodiments, the model (e.g., model 602) may not perform any actions on a user's account. The output of the model (e.g., model 602) is only used to decide which location and/or a delivery time offset to select.

System 600 also includes API layer 650. In some embodiments, API layer 650 may be implemented on mobile device 622 or user terminal 624. Alternatively or additionally. API layer 650 may reside on one or more of cloud components 610. API layer 650 (which may be a REST or Web services API layer) may provide a decoupled interface to data and/or functionality of one or more applications. API layer 650 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services, as well as for exchanging information with partners in B2B transactions.

API layer 650 may use various architectural arrangements. For example, system 600 may be partially based on API layer 650, such that there is strong adoption of SOAP and RESTful Web-services, using resources like Service Repository and Developer Portal, but with low governance, standardization, and separation of concerns. Alternatively, system 600 may be fully based on API layer 650, such that separation of concerns between layers like API layer 650, services, and applications are in place.

In some embodiments, the system architecture may use a microservice approach. Such systems may use two types of layers: a Front-End Layer and a Back-End Layer, where microservices reside in this kind of architecture. The role of the API layer 650 in some cases is to provide integration between Front-End and Back-End. In such cases, API layer 650 may use RESTful APIs (exposition to front-end or even communication between microservices). API layer 650 may use AMQP (e.g., Kafka, RabbitMQ, etc.). API layer 650 may use incipient usage of new communications protocols, such as gRPC, Thrift, etc.

In some embodiments, the system architecture may use an open API approach. In such cases, API layer 650 may use commercial or open source API Platforms and their modules. API layer 650 may use a developer portal. API layer 650 may use strong security constraints applying WAF and DDoS protection, and API layer 650 may use RESTful APIs as standard for external integration.

Figure 7:
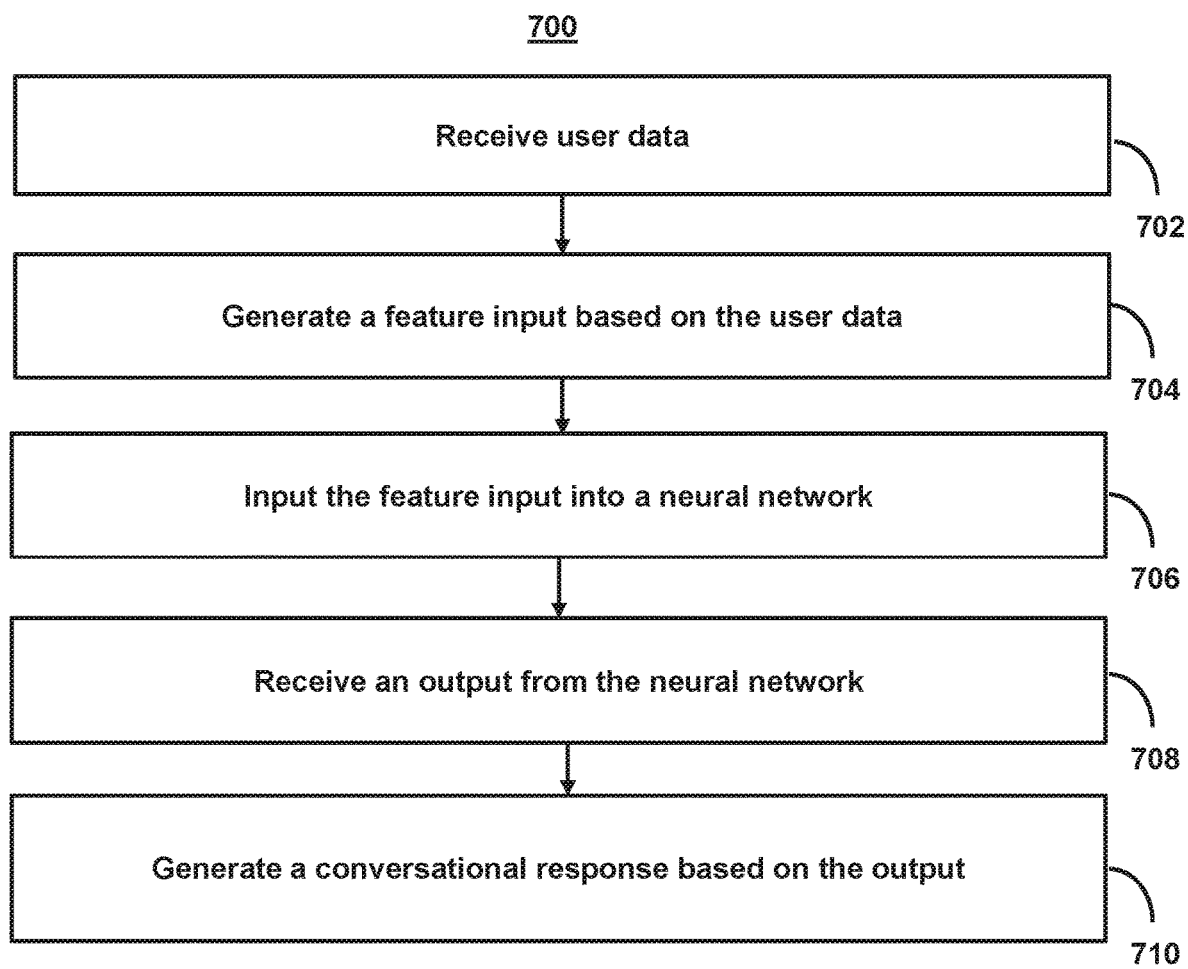
FIG. 7 shows a flowchart of the steps involved in generating dynamic conversational responses using deep conditional learning, in accordance with one or more embodiments.

FIG. 7 shows a flowchart of the steps involved in generating dynamic conversational responses using deep conditional learning, in accordance with one or more embodiments. For example, the system may use process 700 (e.g., as implemented on one or more system components) in order to generating dynamic conversational responses.

At step 702, process 700 (e.g., using one or more components described in system 600 (FIG. 6)) receive user data. For example, the system may receive user data in response to a user interacting with a user interface. The user data may describe one or more characteristics of a user, a user device, and/or one or more interactions of the user with a user device and/or application generating responses.

At step 704, process 700 (e.g., using one or more components described in system 600 (FIG. 6)) generate a feature input based on the user data. For example, the system may generate a feature input based on the user data. For example, the feature input may comprise a column of data (e.g., an input set) that represents characteristics of user data which the system may use to select a conversation response. Alternatively or additionally, the system may include a feature input layer that receives the feature input and applies data normalization.

At step 706, process 700 (e.g., using one or more components described in system 600 (FIG. 6)) input the feature input into a neural network. For example, the system may input the feature input into a first neural network, wherein the first neural network is trained based on a first training regime and/or a second training regime, wherein the first training regime comprises training an initial version of the first neural network based on a first data set and using knowledge distillation and the second training regime comprises further training the initial version based on a second data set and using a second neural network as a constraint, and wherein the second neural network is trained based on a third data set. For example, the system may train the neural network using the system architectures described in FIGS. 2-5.

For example, the second neural network may act as a constraint such that the initial version of the neural network is finely tuned based on the second neural network. For example, the parameters of the second neural network may remain unchanged during the second training regime. Alternatively or additionally, the second neural network may comprise an output layer for the initial version during the second training regime.

The system may select the data for the various data sets based on particular objectives for the neural network and how data for that neural network is used. For example, the first data set may comprise data over a first time period and having a first size, whereas the second data set may comprise data over a second time period and having a second size. For example, the second time period and the second size may be greater than the first time period and the first size, respectively. For example, the second time period may represent a longer time period (e.g., a complete user history of interactions for one or more users). In contrast, the first time period may represent a recent time period (e.g., the current month, day, etc.). The system may apply different models to these data sets to ensure that recent changes is user behavior are incorporated into the model, but do not dominate the model.

Additionally or alternatively, the system may select data specific to a user or a group of users. The system may then tailor the data or algorithm used based on a targeted user. For example, the first data set may comprise data on a plurality of users, and the second data set may comprise feedback data on actual intents of the user. For example, the first data set may comprise data on a plurality of users having a first characteristic. The system may input the feature input into the first neural network in response to determining, based on the user data, that the user has the first characteristics and/or selecting the first neural network from a plurality of neural networks based on the determination that the user has the first characteristics.

The system may select algorithms and architectures for the models based on particular objectives for the neural network and/or how those models for that neural network is used. In some embodiments, training the initial version of the first neural network based on the first data set and using knowledge distillation further comprises training an original model using the first data set. Training the initial version may also comprise training the initial version of the first neural network to mimic predictions made by the original model by minimizing a loss function in which a target is a distribution of class probabilities predicted by the original model. For example, the system may use a loss function or cost function, which is a function that maps an event or values of one or more variables onto a real number intuitively representing some "loss" or "cost" associated with the event. The system then uses an optimization problem that seeks to minimize the loss function or its negative (in specific domains, variously called a reward function, a profit function, a utility function, a fitness function, etc.), in which case it is to be maximized.

At step 708, process 700 (e.g., using one or more components described in system 600 (FIG. 6)) receives an output from the neural network. For example, the system may receive an output from the first neural network. For example, the system may generate a feature output based on the user data as processed by the neural network. For example, the feature output may comprise a column of data (e.g., an output set) that represents probabilities that a user has a particular intent which the system may use to select a conversation response. Alternatively or additionally, the system may include a feature output layer that receives the feature output and applies data normalization.

In some embodiments, the system may use one or more additional processes to generate the output. For example, the system may use a softmax layer to generate a softmax output comprising a multivariate distribution of probable intents of the user. For example, the softmax function, also known as softargmax or normalized exponential function, may be a generalization of the logistic function to multiple dimensions. The system may then apply random changes to weight parameters of the first neural network. For example, the system may use a noise-injection learning algorithm to reduce the effects of experimental noise. The system may then determine interdependencies between variables in the first neural network using stochastic variable inference. For example, using stochastic variable inference may comprise using a stochastic optimization algorithm for mean-field variational inference (e.g., using an algorithm that approximates the posterior distribution of a probabilistic model with hidden variables). The system may then generate a unified probability distribution over the probable intents.

At step 710, process 700 (e.g., using one or more components described in system 600 (FIG. 6)) generates a conversational response based on the output. For example, the system may generate for display, on the user interface, a first dynamic conversational response based on the output, wherein the first dynamic conversational response corresponds to a first probable intent of the user. In some embodiments, the output may comprise a multivariate distribution of probable intents of the user. For example the multivariate distribution may be a generalization of a one-dimensional (e.g., univariate) normal distribution to higher dimensions. In such cases, generating the first dynamic conversational response based on the output comprises selecting the first dynamic conversational response from a plurality of dynamic conversational responses based on the first dynamic conversational response corresponding to the first probable intent, of the probable intents, having a high probability in the multivariate distribution.

In some embodiments, the system may generate multiple responses and/or chains of responses. Furthermore the system may learn based on the user's selection of one or more of the responses. For example, the system may generate for display, on the user interface, simultaneously with the first dynamic conversational response, a second dynamic conversational response. The system may receive a user selection of the first dynamic conversational response. In response to the user selection, the system may update the multivariate distribution of probable intents of the user to reflect that a probability of the user having a second probable intent, of the probable intents, based on the feature input, is zero (e.g., indicating that there is no likelihood that this was the actual intent of the user).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-6 could be used to perform one or more of the steps in FIG. 7.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses using conditional deep learning, the method comprising: receiving user data in response to a user interacting with a user interface; generating a feature input based on the user data; inputting the feature input into a first neural network, wherein the first neural network is trained based on a first training regime and a second training regime, wherein the first training regime comprises training an initial version of the first neural network based on a first data set and using knowledge distillation, and wherein the second training regime comprises further training the initial version based on a second data set and using a second neural network as a constraint, and wherein the second neural network is trained based on a third data set; receiving an output from the first neural network; and generating for display, on the user interface, a first dynamic conversational response based on the output, wherein the first dynamic conversational response corresponds to a first probable intent of the user.

2. The method of any one of the preceding embodiments, wherein the first data set comprises data over a first time period and having a first size, wherein the second data set comprises data over a second time period and having a second size, and wherein the second time period and the second size are greater than the first time period and the first size, respectively.

3. The method of any one of the preceding embodiments, wherein training the initial version of the first neural network based on the first data set and using knowledge distillation further comprises: training an original model using the first data set; and training the initial version of the first neural network to mimic predictions made by the original model by minimizing a loss function in which a target is a distribution of class probabilities predicted by the original model.

4. The method of any one of the preceding embodiments, wherein the output comprises a multivariate distribution of probable intents of the user, and wherein generating the first dynamic conversational response based on the output comprises selecting the first dynamic conversational response from a plurality of dynamic conversational responses based on the first dynamic conversational response corresponding to the first probable intent of the probable intents, having a high probability in the multivariate distribution.

5. The method of any one of the preceding embodiments, wherein receiving the output from the first neural network further comprises: using a softmax layer to generate a softmax output comprising a multivariate distribution of probable intents of the user; applying random changes to weight parameters of the first neural network; determining interdependencies between variables in the first neural network using stochastic variable inference; and generating a unified probability distribution over the probable intents.

6. The method of any one of the preceding embodiments, further comprising: generating for display, on the user interface, simultaneously with the first dynamic conversational response, a second dynamic conversational response; receiving a user selection of the first dynamic conversational response; in response to the user selection, updating a multivariate distribution of probable intents of the user to reflect that a probability of the user having a second probable intent, of the probable intents, based on the feature input, is zero.

7. The method of any one of the preceding embodiments, wherein first data set comprises data on a plurality of users, and wherein the second data set comprises feedback data on actual intents of the user.

8. The method of any one of the preceding embodiments, wherein the first data set comprises data on a plurality of users having a first characteristic, and wherein inputting the feature input into the first neural network is done in response to: determining, based on the user data, that the user has the first characteristics; and selecting the first neural network, from a plurality of neural networks, based on determining that the user has the first characteristics.

9. The method of any one of the preceding embodiments, wherein parameters of the second neural network remain unchanged during the second training regime.

10. The method of any one of the preceding claims, wherein the second neural network comprises an output layer for the initial version during the second training regime.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating dynamic conversational responses using conditional deep learning, the system comprising:
cloud-based storage circuitry configured to store a first neural network that is trained based on a first training regime and a second training regime, wherein the first training regime comprises training an initial version of the first neural network based on a first data set and using knowledge distillation to mimic predictions made by a first model by minimizing a loss function in which a target is a distribution of class probabilities predicted by the first model, wherein the second training regime comprises further training the initial version based on a second data set and using a second neural network as a constraint, wherein the second neural network (i) is trained based on a third data set, (ii) has parameters that remain unchanged during the second training regime, (iii) comprises an output layer for the initial version during the second training regime, and (iv) weights of the second neural network are updated by switching labels of the initial version at a minibatch level, and wherein first data set comprises data on a plurality of users, and wherein the second data set comprises feedback data on actual intents of a user;
cloud-based control circuitry configured to:
receive user data in response to a user interacting with a user interface;
generate a feature input based on the user data;
input the feature input into a first neural network, wherein the first neural network is trained based on a first training regime and a second training regime;
receive an output from the first neural network; and
cloud-based input/output circuitry configured to:
generate for simultaneous display, on the user interface, a first dynamic conversational response and a second dynamic conversational response based on the output, wherein the first dynamic conversational response corresponds to a first probable intent of the user, wherein the second dynamic conversational response corresponds to a second probable intent of the user, and wherein each dynamic conversational response is generated for display with its respective probability.

2. A method for generating dynamic conversational responses using conditional deep learning, the method comprising:
receiving user data in response to a user interacting with a user interface;
generating a feature input based on the user data;
inputting the feature input into a first neural network, wherein the first neural network is trained based on a first training regime and a second training regime, wherein the first training regime comprises training an initial version of the first neural network based on a first data set and using knowledge distillation, wherein the second training regime comprises further training the initial version based on a second data set and using a second neural network as a constraint, wherein parameters of the second neural network remain unchanged during the second training regime, wherein class probabilities of the second neural network are used as targets while training the first neural network, wherein the second neural network is an ensemble of simpler models, wherein a geometric or arithmetic mean of predictive distributions of the ensemble of simpler models is used as a target, and wherein the second neural network is trained based on a third data set;
receiving an output from the first neural network; and
generating for display, on the user interface, a first dynamic conversational response based on the output, wherein the first dynamic conversational response corresponds to a first probable intent of the user.

3. The method of claim 2, wherein the first data set comprises data over a first time period and having a first size, the second data set comprises data over a second time period and having a second size, and wherein the second time period and the second size are greater than the first time period and the first size, respectively.

4. The method of claim 2, wherein training the initial version of the first neural network based on the first data set and using knowledge distillation further comprises:
training an original model using the first data set; and
training the initial version of the first neural network to mimic predictions made by the original model by minimizing a loss function in which a target is a distribution of class probabilities predicted by the original model.

5. The method of claim 2, wherein the output comprises a multivariate distribution of probable intents of the user, and wherein generating the first dynamic conversational response based on the output comprises selecting the first dynamic conversational response from a plurality of dynamic conversational responses.

6. The method of claim 2, further comprising:
generating for display, on the user interface, simultaneously with the first dynamic conversational response, a second dynamic conversational response;
receiving a user selection of the first dynamic conversational response; and
in response to the user selection, updating a multivariate distribution of probable intents of the user to reflect a probability that the user has a second probable intent, of the probable intents, based on the feature input, is zero.

7. The method of claim 2, wherein first data set comprises data on a plurality of users, and wherein the second data set comprises feedback data on actual intents of the user.

8. The method of claim 2, wherein the first data set comprises data on a plurality of users having a first characteristic, and wherein inputting the feature input into the first neural network is done in response to:
determining, based on the user data, that the user has the first characteristic; and
selecting the first neural network, from a plurality of neural networks, based on determining that the user has the first characteristic.

9. The method of claim 2, wherein the second neural network comprises an output layer for the initial version during the second training regime.

10. The method of claim 2, wherein the first neural network probabilistic programming comprises a programming paradigm in which probabilistic models are specified and inference for these models is performed automatically.

11. The method of claim 2, wherein receiving the output from the first neural network further comprises:
determining interdependencies between variables in the first neural network using stochastic variable inference; and
generating a unified probability distribution based on the output.

12. The method of claim 2, wherein receiving the output from the first neural network further comprises:
generating a softmax output comprising a multivariate distribution of probable intents of the user; and
applying random changes to weight parameters of the first neural network based on the softmax output.

13. A non-transitory computer-readable medium for generating dynamic conversational responses using conditional deep learning, comprising instructions that, when executed on one or more processors, cause operations comprising:
receiving user data in response to a user interacting with a user interface;
generating a feature input based on the user data;
inputting the feature input into a first neural network, wherein the first neural network is trained based on a first training regime and a second training regime, wherein the first training regime comprises training an initial version of the first neural network based on a first data set and using knowledge distillation to mimic predictions made by a first model by minimizing a loss function in which a target is a distribution of class probabilities predicted by the first model, wherein the second training regime comprises further training the initial version based on a second data set and using a second neural network as a constraint, wherein parameters of the second neural network remain unchanged during the second training regime, wherein weight parameters of the initial version are subject to random changes, and wherein the second neural network is trained based on a third data set;
receiving an output from the first neural network; and
generating for display, on the user interface, a first dynamic conversational response based on the output, wherein the first dynamic conversational response corresponds to a first probable intent of the user.

14. The non-transitory computer-readable medium of claim 13, wherein the first data set comprises data over a first time period and having a first size, wherein the second data set comprises data over a second time period and having a second size, and wherein the second time period and the second size are greater than the first time period and the first size, respectively.

15. The non-transitory computer-readable medium of claim 12, wherein training the initial version of the first neural network based on the first data set and using knowledge distillation further comprises:
training an original model using the first data set; and
training the initial version of the first neural network to mimic predictions made by the original model by minimizing a loss function in which a target is a distribution of class probabilities predicted by the original model.

16. The non-transitory computer-readable medium of claim 13, wherein the output comprises a multivariate distribution of probable intents of the user, and wherein generating the first dynamic conversational response based on the output comprises selecting the first dynamic conversational response from a plurality of dynamic conversational responses.

17. The non-transitory computer-readable medium of claim 13, wherein the instructions further cause operations comprising:
generating for display, on the user interface, simultaneously with the first dynamic conversational response, a second dynamic conversational response;
receiving a user selection of the first dynamic conversational response; and
in response to the user selection, updating a multivariate distribution of probable intents of the user to reflect a probability of the user having a second probable intent, of the probable intents, based on the feature input, is zero.

18. The non-transitory computer-readable medium of claim 13, wherein first data set comprises data on a plurality of users, and wherein the second data set comprises feedback data on actual intents of the user.

19. The non-transitory computer-readable medium of claim 13, wherein the first data set comprises data on a plurality of users having a first characteristic, and wherein inputting the feature input into the first neural network is done in response to:
  determining, based on the user data, that the user has the first characteristic; and
  selecting the first neural network, from a plurality of neural networks, based on determining that the user has the first characteristic.

20. The non-transitory computer-readable medium of claim 13, wherein the second neural network comprises an output layer for the initial version during the second training regime.

\* \* \* \* \*